Patented Dec. 28, 1926.

1,611,978

UNITED STATES PATENT OFFICE.

RICHARD WOLFFENSTEIN, OF BERLIN-DAHLEM, GERMANY.

PROCESS OF MAKING NITROGEN CONTAINING DERIVATIVES OF TERPENE ALCOHOLS.

No Drawing. Application filed March 29, 1926, Serial No. 98,338, and in Germany July 2, 1923.

The production of esters of terpene alcohols is frequently not as easily possible as with the alcohols of the fatty acids. Also the production of pure esters of terpene alcohols is more difficult, because the esters of the terpene alcohols consist mostly of substances boiling at high temperatures, which must be distilled under reduced pressure.

According to this invention esters of terpene alcohols may be obtained, whereby the purification by distillation is dispensed with by the fact that they may be transferred into well crystallized salts. By this the esters may easily be obtained in a form of greatest purity. The purity of the compounds obtained by the process according to this invention is of especial importance, because on account of their physiological efficiency they may be used as medicines.

Esters of the kind mentioned may be obtained, if the terpene alcohols are condensed with the carboxylic acids of the pyridine series, by treating said acids with an addition of condensing agents, or by causing the transformation of the alcohols or alcoholates with the halides of the acids.

For the process according to this invention the following four examples are given.

*First example.*

41 g. nicotinic acid and 50 g. menthol are added to 100 g. benzol or a similar solvent, and thereupon 50 g. phosphorus oxychloride (POCl$_3$) are added. The mixture is heated for several hours upon a water bath with reflux. After reaction has taken place and after the mixture has cooled off, a solution of sodium carbonate is added until the mixture becomes alkaline, thereupon the benzol solution is separated and the benzol removed therefrom. The remaining reaction product is now dissolved in ether and mixed with etherized sulphuric acid. By this the sulphate of the new compound will precipitate in crystallized form, and in a condition of perfect purity.

This substance, after a short preliminary softening, will have a melting point between 156 and 157 degrees centigrade. It will very easily be dissolved by ethyl alcohol but difficultly by petroleum ether. By the action of water the substance will be transformed into a free ester-base by action of hydrolysis.

*Second example.*

A mixture consisting of 20 g. nicotinic acid, 25 g. borneol and 25 g. phosphorus oxychloride is boiled with 50 ccm. benzol for some hours with reflux, and after cooling off a solution of sodium carbonate is added in an excessive quantity, whereupon the benzol solution is separated and several times shaken through with a stronger mineral acid.

This watery solution of acid is made alkaline with sodium carbonate, shaken out together with ether. The ether solution is clarified by carbon and dried with calcium chloride, and thereupon from the ether solution the sulphate of the bornyl ester of nicotinic acid is precipitated by an addition of etherized sulphuric acid.

A substance will be obtained in well crystallized form and of complete purity. This substance will commence to become soft at a temperature of 115 degrees centigrade and will be in molten condition at a temperature of 150 degrees centigrade. In other respects this compound will behave similar to the product obtained by the process according to the first example above given.

*Third example.*

The menthyl ester of picolinic acid is obtained by boiling picolinic acid chloride with a like quantity of menthol in a solution of xylol at a temperature of about 150-160 degrees centigrade. This ester also will produce a well crystallized sulphate.

*Fourth example.*

The bornyl ester of picolinic acid is obtained by the reaction taking place between 20 g. picolinic acid, 25 g. borneol and 25 g. phosphorus oxychloride. The sulphate of the bornyl picolinic acid ester will crystallize well. Its melting point is at a temperature of 140 degrees centigrade.

The esters obtained by the herein described processes are destined for therapeutical purposes, especially on account of their activity upon the parasympathical innervation of the organs, e. g. the stomach.

I claim:

1. A process for the preparation of nitrogenous derivatives of terpene alcohols comprising the steps of condensing a terpene alcohol with a carboxylic acid of the pyridine series in the presence of a condensing agent, treating the condensation product with etherized sulphuric acid; separating the precipitated crystalline sulphate and hydrolyzing it to the free ester base.

2. A process for the preparation of nitrogenous derivatives of terpene alcohols comprising the steps of treating under the action of heat a mixture of a hydrocarbon solvent, a terpene alcohol and a carboxylic acid of the pyridine series in the presence of a condensing agent; rendering the mixture alkaline; dissolving out the condensation product with ether; precipitating the sulphate with etherized sulphuric acid and hydrolyzing it with water to the free ester base.

3. A new product of manufacture consisting of an ester of a terpene alcohol and an acid of the pyridine series.

4. A new product of manufacture consisting of the menthol ester of nicotinic acid.

In testimony whereof I hereunto affix my signature.

RICHARD WOLFFENSTEIN.